US010223213B2

(12) United States Patent
Resch (10) Patent No.: US 10,223,213 B2
(45) Date of Patent: Mar. 5, 2019

(54) SALTED ZERO EXPANSION ALL OR NOTHING TRANSFORMATION

(71) Applicant: International Business Machines Corporation, Armonk, NY (US)

(72) Inventor: Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/804,081

(22) Filed: Nov. 6, 2017

(65) Prior Publication Data

US 2018/0060186 A1 Mar. 1, 2018

Related U.S. Application Data (63) Continuation-in-part of application No. 15/276,077, filed on Sep. 26, 2016, which is a continuation of (Continued)

(51) Int. Cl.
*G06F 11/10* (2006.01)
*G06F 11/14* (2006.01)
(Continued)

(52) U.S. Cl.
CPC ...... *G06F 11/1469* (2013.01); *G06F 11/1092* (2013.01); *G06F 11/1448* (2013.01);
(Continued)

(58) Field of Classification Search
CPC ............... G06F 17/30902; G06F 11/10; G06F 11/1092; G06F 11/1448; G06F 11/1469;
(Continued)

(56) References Cited

U.S. PATENT DOCUMENTS 4,092,732 A 5/1978 Ouchi
5,454,101 A 9/1995 Mackay et al.
(Continued)

FOREIGN PATENT DOCUMENTS

WO 2004061605 A2 7/2004

OTHER PUBLICATIONS

Shamir; How to Share a Secret; Communications of the ACM; vol. 22, No. 11; Nov. 1979; pp. 612-613.
(Continued)

*Primary Examiner* — Robert B Harrell
(74) *Attorney, Agent, or Firm* — Garlick & Markison; Timothy W. Markison; Randy W. Lacasse (57) ABSTRACT

A method for execution by a dispersed storage network (DSN), the method begins by injecting generated data into a data segment to produce mixed data, partitioning the mixed data to produce first and second data partitions, performing a deterministic function on the first data partition to produce a first key, encrypting the second data partition using the first key to produce an encrypted second data partition, performing the deterministic function on the encrypted second data partition to produce a second key, encrypting the first data partition using the second key to produce an encrypted first data partition, performing the deterministic function on the encrypted first data partition to produce a third key, encrypting the encrypted second data partition to produce a re-encrypted second data partition, aggregating the encrypted first data partition and the re-encrypted second data partition to produce a secure package, and encoding the secure package and storing.

20 Claims, 7 Drawing Sheets

Related U.S. Application Data application No. 14/215,542, filed on Mar. 17, 2014, now Pat. No. 9,456,035.

(60) Provisional application No. 61/819,039, filed on May 3, 2013.

(51) Int. Cl.
*G06F 17/30* (2006.01)
*H04L 29/08* (2006.01)

(52) U.S. Cl.
CPC .. *G06F 17/30194* (2013.01); *G06F 17/30227* (2013.01); *H04L 67/1097* (2013.01); *G06F 2211/1028* (2013.01); *H04L 67/306* (2013.01)

(58) Field of Classification Search
CPC ......... G06F 17/30194; G06F 17/30227; G06F 2211/1028; H04L 29/08072; H04L 29/06; H04L 29/08549; H04L 29/08144; H04L 67/306; H04L 67/1097
USPC ........................................................ 709/213
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0250672 A1 | 10/2007 | Stroberger et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0307841 A1 | 12/2011 | Boldyrev et al. |
| 2011/0314072 A1 | 12/2011 | Resch et al. |
| 2013/0086442 A1 | 4/2013 | Baptist et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
European Patent Office; Extended European Search Report; dated Nov. 15, 2016; 8 pgs.
International Searching Authority; International Search Report and Written Opinion; International Application No. PCT/US2014/35528; dated Sep. 25, 2014; 7 pgs.

SALTED ZERO EXPANSION ALL OR NOTHING TRANSFORMATION

CROSS-REFERENCE TO RELATED APPLICATIONS

The present U.S. Utility patent application claims priority pursuant to 35 U.S.C. § 120 as a continuation-in-part of U.S. Utility application Ser. No. 15/276,077, entitled "STORING RELATED DATA IN A DISPERSED STORAGE NETWORK," filed Sep. 26, 2016, which is a continuation of U.S. Utility application Ser. No. 14/215,542, entitled "STORING RELATED DATA IN A DISPERSED STORAGE NETWORK," filed Mar. 17, 2014, now U.S. Pat. No. 9,456,035 issued on Sep. 27, 2016, which claims priority pursuant to 35 U.S.C. § 119(e) to U.S. Provisional Application No. 61/819,039, entitled "SLICE MIGRATION TRACKING IN A DISPERSED STORAGE NETWORK," filed May 3, 2013, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
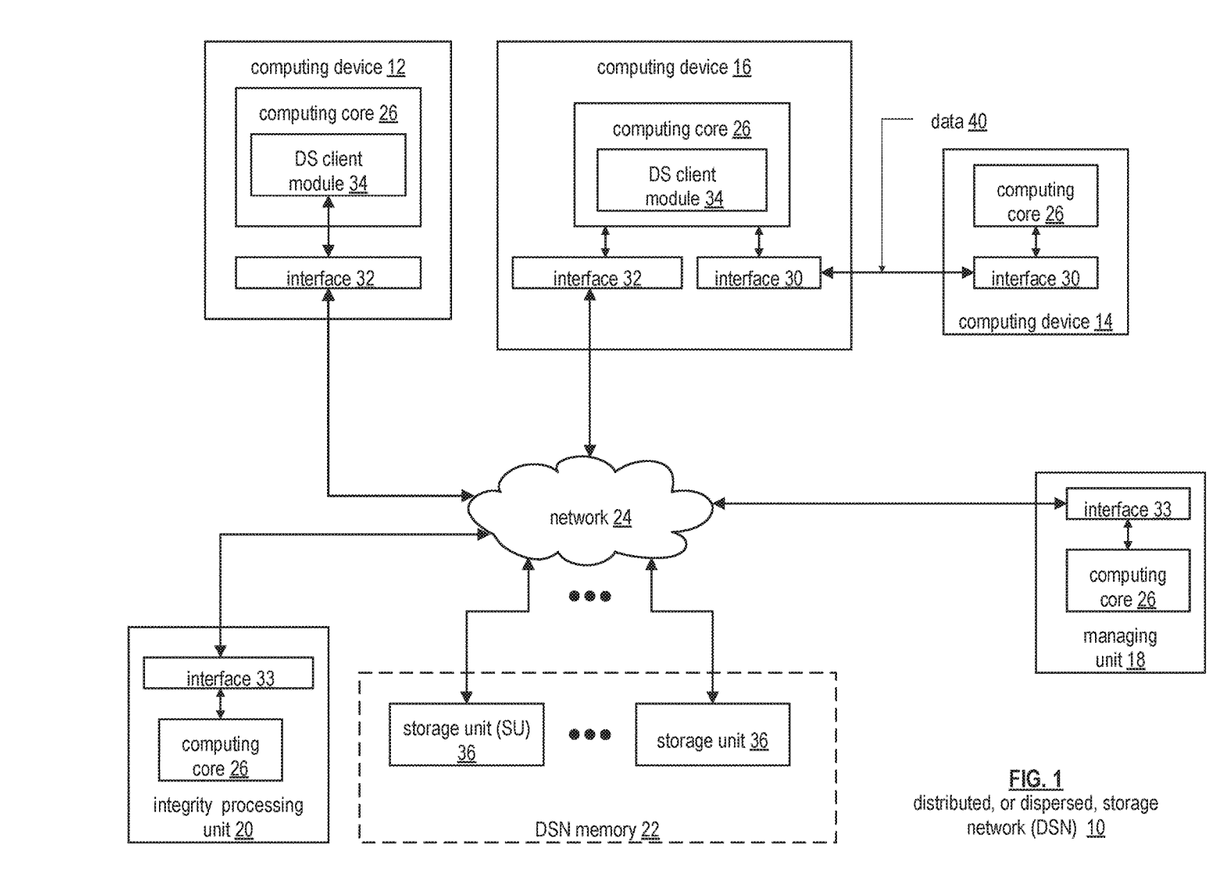
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
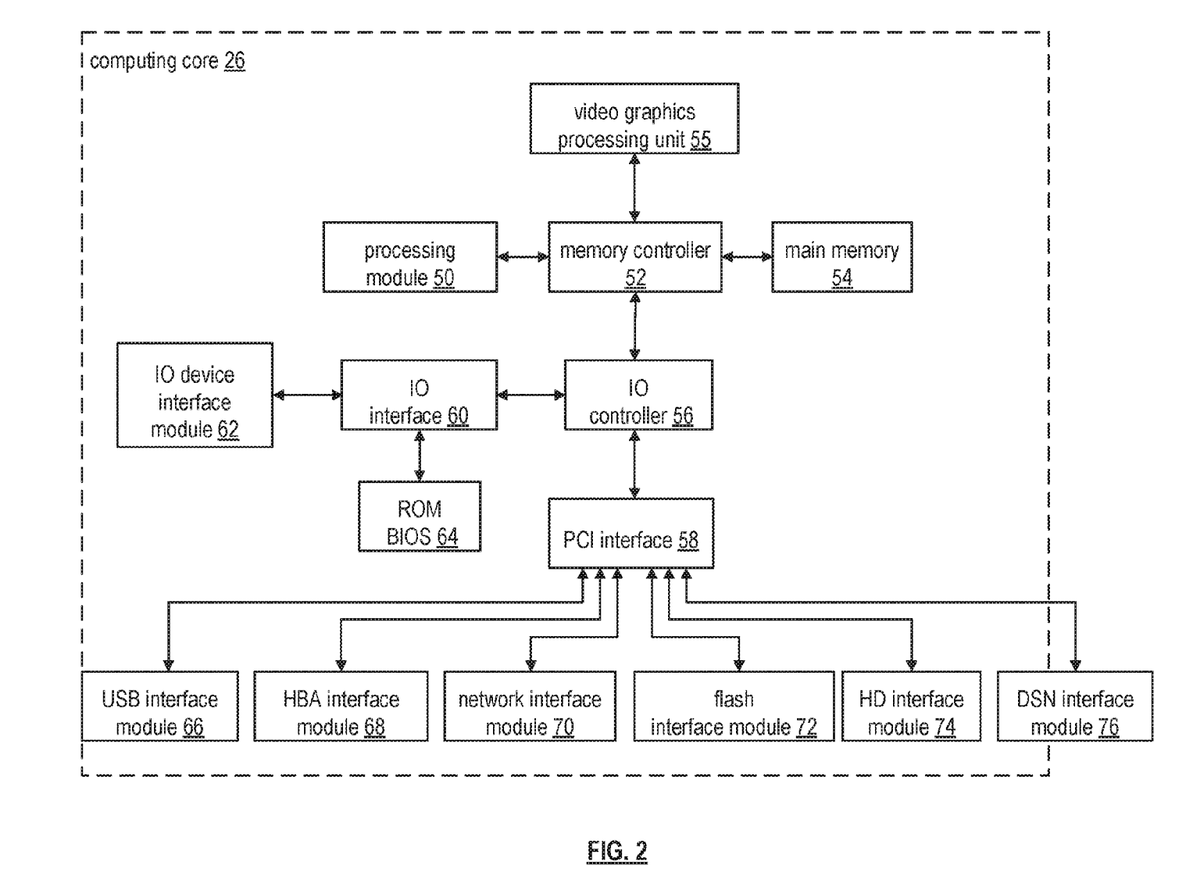
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
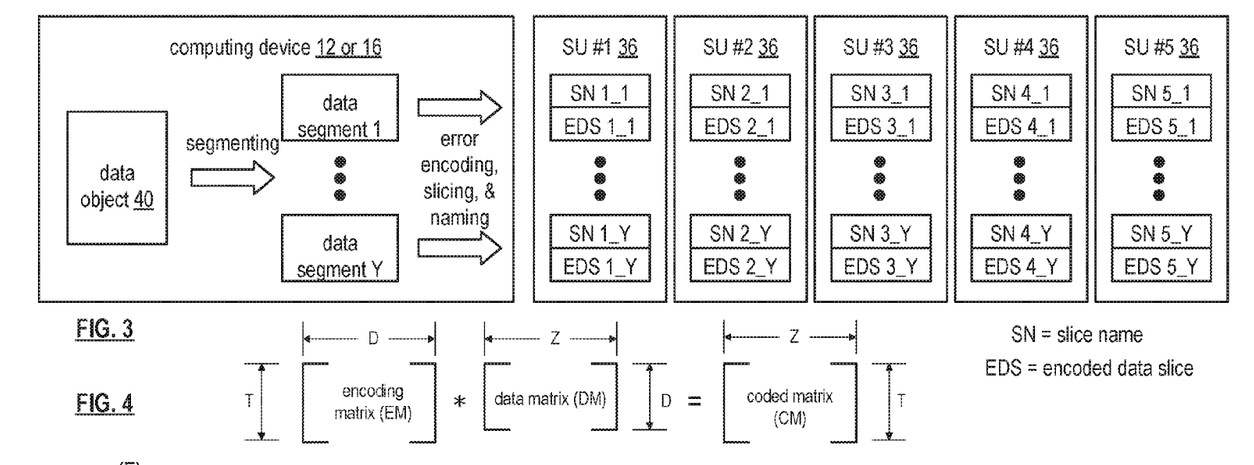
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
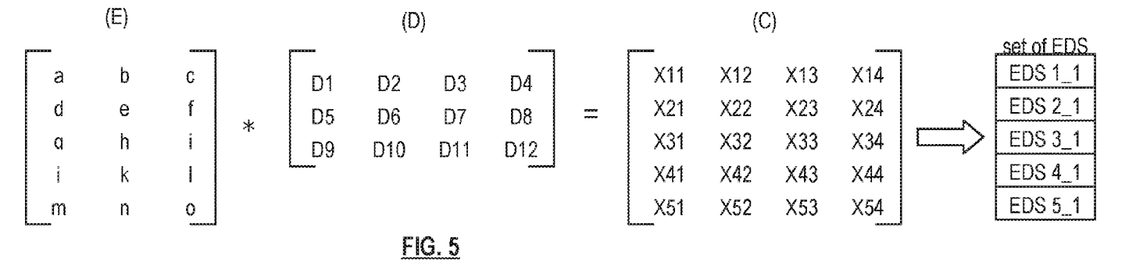
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
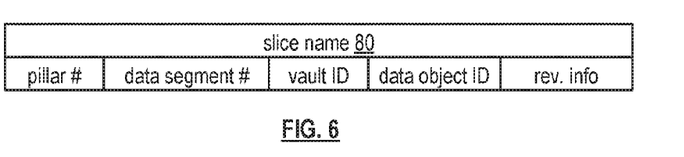
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
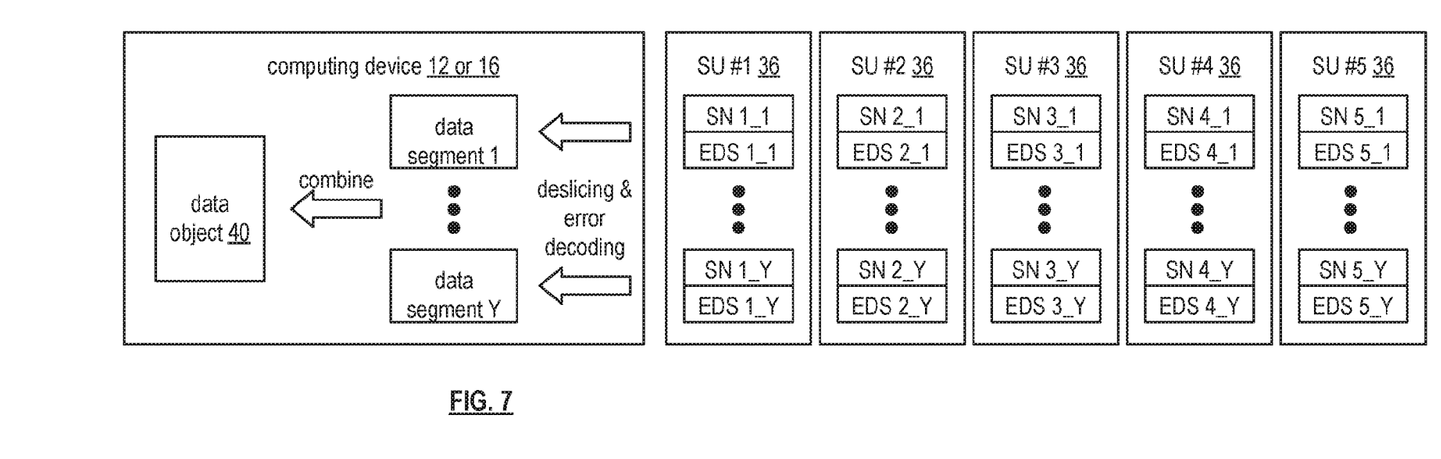
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
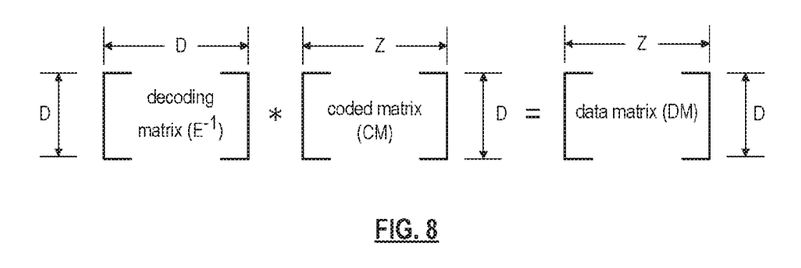
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
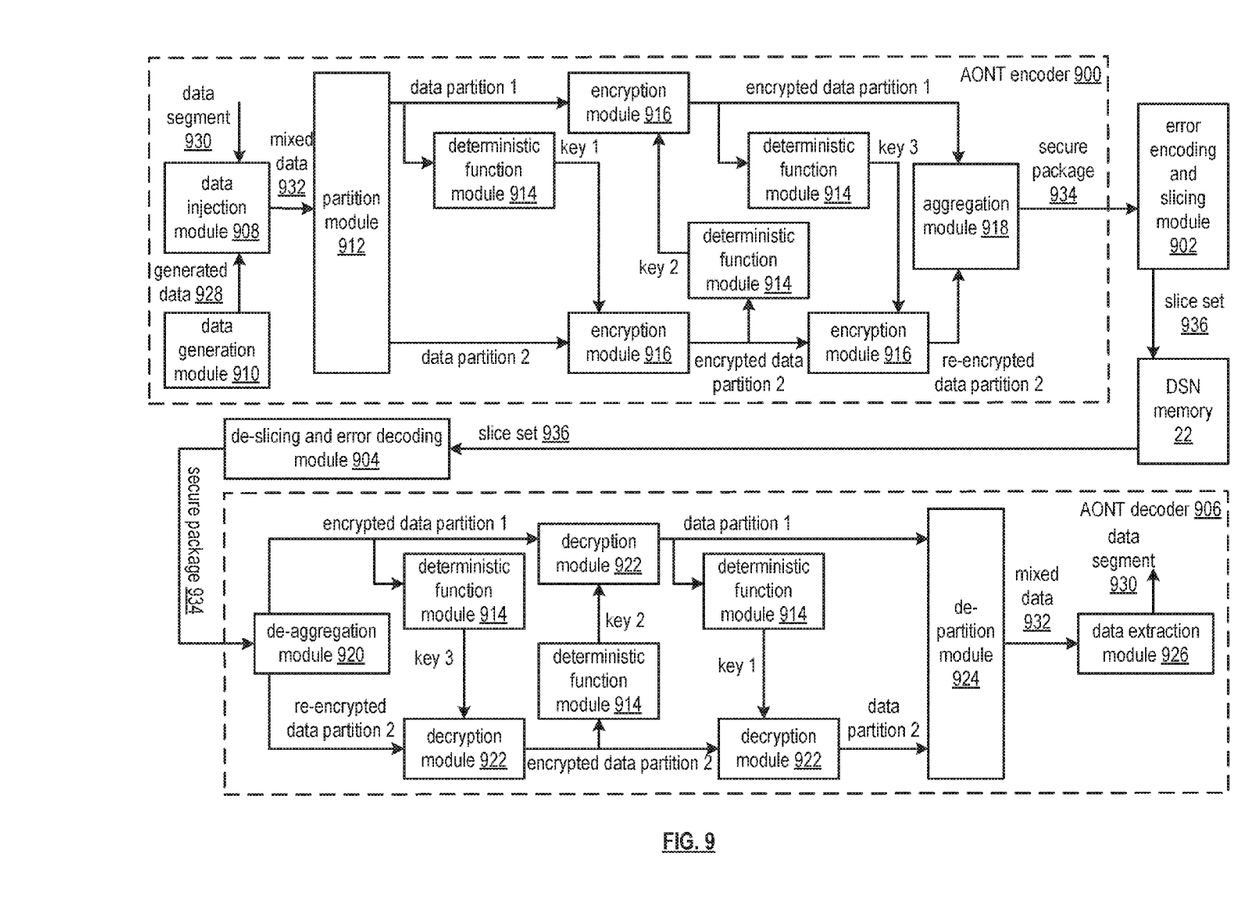
FIG. 9 is a schematic block diagram of an embodiment of a zero expansion all or nothing transformation (AONT) system in accordance with the present invention.

FIG. 9 is a schematic block diagram of an embodiment of a zero expansion all or nothing transformation (AONT) system. In particular, a system is presented for use in conjunction with one or more functions and features described in conjunction with FIGS. 1-2, 3-8, 9A and 9B. In one embodiment, AONT (All-or-nothing transform) may be implemented such that a total storage size does not expand when AONT is applied. For example, the data is split into two halves, the hash of the first half is used to encrypt the second half, the hash of the encrypted second half is then used to encrypt the first half, and finally, the hash of the encrypted first half is used to re-encrypt the encrypted second half. Without the first encrypted half and the doubly-encrypted second half, nothing about the original data can be learned without possession of the complete set of the two halves. (Note with only 2 passes, something about the first half can be learned if all of the second half is known but only part of the first half is known). However, one limitation of zero-expansion AONT is that it is necessarily deterministic. The same input data will always yield the same AONT package. In one embodiment, to prevent this, an amount of random data (or salt), of arbitrary size, is added to the data prior to application of the zero-expansion AONT. For example, 4 random bytes would produce $2^{32}$ or roughly 4 billion possibilities for the same input data. This overhead may be significantly less than including the entire randomly generated encryption key as in other incarnations of the AONT. In addition to the random salt value, an arbitrary number of "check digits" may be added to the data prior to encoding, which may be verified and removed upon decoding to ensure the data was not tampered with.

Referring again to FIG. 9, the system includes an AONT encoder 900, an error encoding and slicing module 902, a dispersed storage network (DSN) memory 22, a de-slicing and error decoding module 904, and an AONT decoder 906. The AONT encoder includes a data injection module 908, a data generation module 910, a petition module 912, one or more deterministic function modules 914, one or more encryption modules 916, and an aggregation module 918. The AONT decoder includes a de-aggregation module 920, one or more deterministic function modules 914, one or more decryption modules 922, a de-partition module 924, and a data extraction module 926. The zero expansion AONT system functions to obfuscate data for storage as a set of encoded data slices in the DSN memory, where the obfuscating produces a different set of encoded data slices for each instance of obfuscating and storing data that is identical to a previous instance.

The data generation module generates one or more of a plurality of random data bytes (e.g., to provide variance between storage instances) and a plurality of check bytes (e.g., for subsequent tampering detection during recovery of the data from the DSN memory) as generated data 928. The data injection module injects the generated data into a data segment 930 in accordance with an injection approach to produce mixed data 932. The injection approach includes at least one of interleaving, substituting, appending, or performing a deterministic function. For example, the data injection module injects four bytes of random data of the generated data into the data segment every 1000 bytes from the beginning of the data segment to produce the mixed data. The partition module partitions the mixed data to produce a data partition 1 and a data partition 2 in accordance with a partitioning approach. The partitioning approach includes indicating which one or more portions of the mixed data are to be partitioned into the data partitions 1 and 2. For example, the partitioning approach indicates to partition the mixed data to include a first half of the mixed data as the data partition 1 and to include a second half of the mixed data as the data partition 2.

The deterministic function module applies a deterministic function to data partition 1 to produce a key 1. The deterministic function includes at least one of a hashing function, a cyclic redundancy code function, a hash based message authentication code function, a mask generating function, a truncation function, or a sponge function. For example, the deterministic function module applies the mask generating function to the data partition 1 to produce an interim result and applies a truncation function to the interim result to produce a key, where the truncation function produces the key 1 to include a number of bits for keys utilized by the encryption module. The encryption module encrypts data partition 2 using key 1 to produce encrypted data partition 2. The deterministic function module performs another deterministic function on the encrypted data partition 2 to produce key 2. The encryption module encrypts data partition 1 using the key 2 to produce an encrypted data partition 1. The deterministic function module performs yet another deterministic function on the encrypted data partition 1 to produce key 3. The encryption module encrypts the encrypted data partition 2 to produce a re-encrypted data partition 2. The aggregation module aggregates the encrypted data partition 1 and the re-encrypted data partition 2 in accordance with an aggregation scheme to produce a secure package 934. The aggregation scheme includes at least one of interleaving or appending.

The error encoding and slicing module encodes the secure package using a dispersed storage error coding function to produce a slice set 936 for storage in the DSN memory. Upon retrieval, the de-slicing and error decoding module receives the slice set from the DSN memory. The de-slicing and error decoding module 904 decodes the slice at using the dispersed storage error coding function to reproduce the secure package 934. The de-aggregation module de-aggregates the secure package in accordance with the aggregation scheme to reproduce the encrypted data partition 1 and the re-encrypted data partition 2.

The deterministic function module of the AONT decoder performs the deterministic function performed by the AONT encoder to produce key 3 on the encrypted data partition 1 to reproduce key 3. The decryption module decrypts the re-encrypted data partition 2 using the reproduced key 3 to reproduce the encrypted data partition 2. The deterministic function module of the AONT decoder performs the deterministic function performed by the AONT encoder to produce key 2 on the encrypted data partition 2 to reproduce key 2. The decryption module decrypts the encrypted data partition 1 using the reproduced key 2 to reproduce data partition 1. The deterministic function module of the AONT decoder performs the deterministic function performed by the AONT encoder to produce key 1 on the data partition 1 to reproduce key 1. The decryption module decrypts the encrypted data partition 2 using the key 1 to reproduce the data partition 2.

The de-partition module de-partitions the data partition 1 and the data partition 2 in accordance with the partitioning approach to reproduce the mixed data 932. The data extraction module extracts the data segment 930 from the mixed data in accordance with the injection approach. For example, the data extraction module identifies and discards the generated data in accordance with the injection approach. Alternatively, or in addition to, the data extraction module verifies the data segment by matching check bytes of the generated data portion of the mixed data in accordance with the injection approach.

Figure 9A:
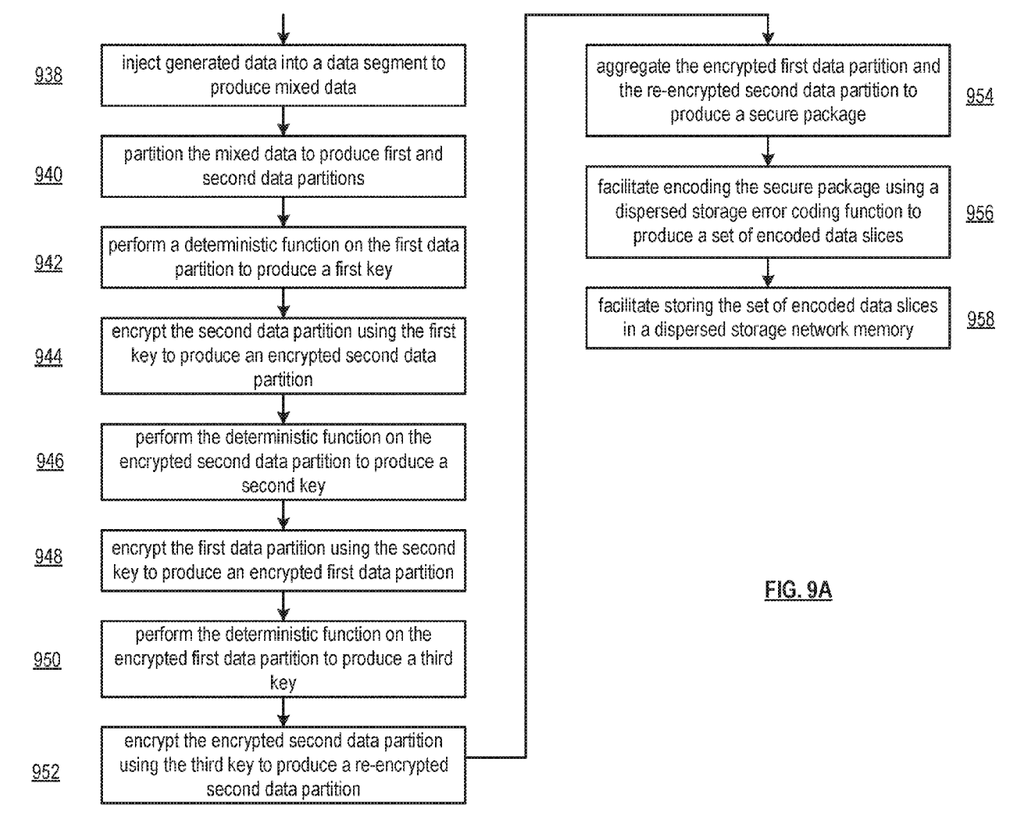
FIG. 9A is a flowchart illustrating an example of transforming data in accordance with the present invention.

FIG. 9A is a flowchart illustrating an example of transforming data. In particular, a method is presented for use in conjunction with one or more functions and features described in conjunction with FIGS. 1-2, 3-8, 9 and also FIG. 9A.

The method begins at step 938 where a processing module (e.g., of a distributed storage and task (DST) client module, of a dispersed storage (DS) processing module) injects generated data into a data segment to produce the mixed data in accordance with a data injection scheme. The injecting includes generating the generated data by one or more of:

retrieving or generating a plurality of random bytes or generating a plurality of check bytes. The method continues at step 940 where the processing module partitions the mixed data in accordance with a partitioning approach (e.g., 50/50, 60/40) to produce first and second data partitions. The method continues at step 942 where the processing module performs a deterministic function on the first data partition to produce a first key. For example, the processing module performs a hashing function on the first data partition to produce an interim result and truncates the interim result to produce the first key with a desired number of bits. The method continues at step 944 where the processing module encrypts the second data partition using the first key to produce an encrypted second data partition. The method continues at step 946 where the processing module performs the deterministic function on the encrypted second data partition to produce a second key.

The method continues at step 948 where the processing module encrypts the first data partition using the second key to produce an encrypted first data partition. The method continues at step 950 where the processing module performs the deterministic function on the encrypted first data partition to produce a third key. The method continues at step 952 where the processing module encrypts the encrypted second data partition using the third key to produce a re-encrypted second data partition. The method continues at step 954 where the processing module aggregates the encrypted first data partition and the re-encrypted second data partition in accordance with an aggregation scheme to produce a secure package. The aggregating includes at least one of interleaving or appending. The method continues at step 956 where the processing module facilitates encoding the secure package using a dispersed storage error coding function to produce a set of encoded data slices. For example, the processing module encodes the secure package using the dispersed storage error coding function to produce the set of encoded data slices. The method continues at step 958 where the processing module facilitates storing the set of encoded data slices in a dispersed storage network (DSN) memory. The facilitating includes at least one of sending the set of encoded data slices to an output module or outputting the set of encoded data slices to the DSN memory.

Figure 9B:
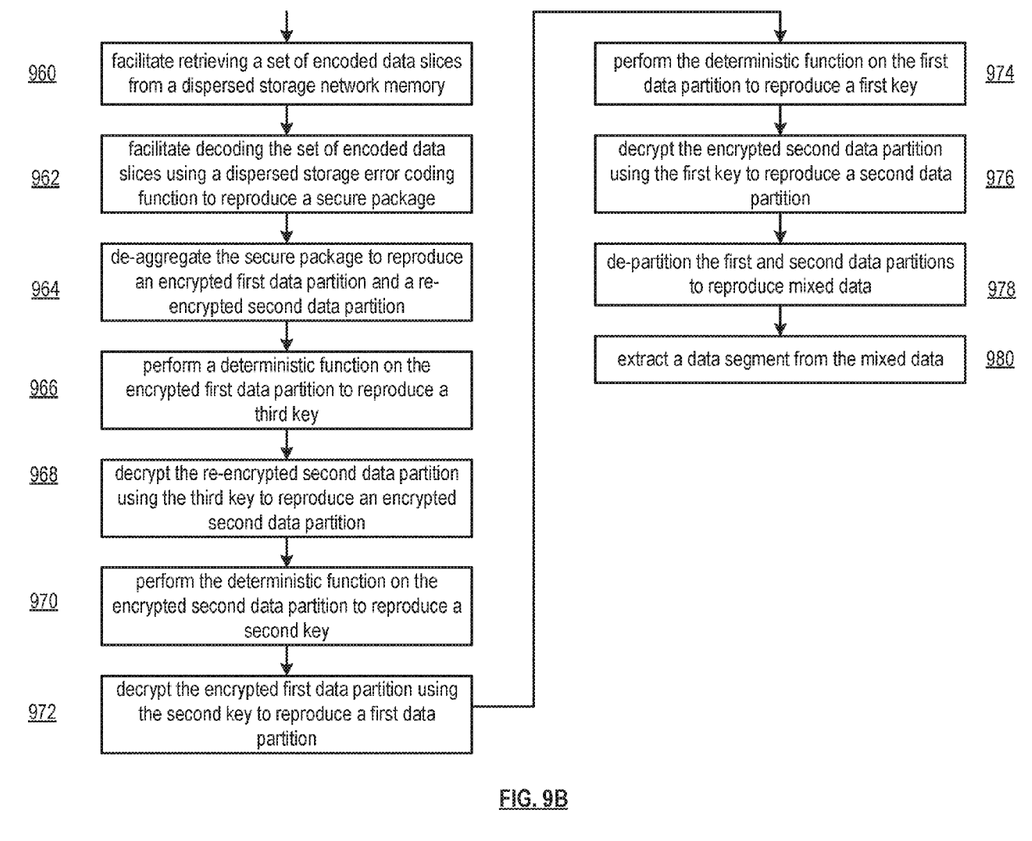
FIG. 9B is a flowchart illustrating an example of de-transforming data in accordance with the present invention.

FIG. 9B is a flowchart illustrating an example of de-transforming data. In particular, a method is presented for use in conjunction with one or more functions and features described in conjunction with FIGS. 1-2, 3-8, 9, 9A and also FIG. 9B.

The method begins at step 960 where a processing module (e.g., of a distributed storage and task (DST) client module, of a dispersed storage (DS) processing module) facilitates retrieving a set of encoded data slices from a dispersed storage network (DSN) memory. The facilitating includes at least one of issuing slice retrieval requests or receiving at least a decode threshold number of encoded data slices of the set of encoded data slices from the DSN memory. The method continues at step 962 where the processing module facilitates decoding the set of encoded data slices using a dispersed storage error encoding function to reproduce a secure package. The facilitating includes decoding the at least the decode threshold number of encoded data slices of the set of encoded data slices using the dispersed storage error coding function to reproduce the secure package. The method continues at step 964 where the processing module de-aggregates the secure package in accordance with an aggregation scheme to reproduce an encrypted first data partition and a re-encrypted second data partition.

The method continues at step 966 where the processing module performs a deterministic function on the encrypted first data partition to reproduce a third key, where the deterministic function is substantially the same as a deterministic function utilized by a transforming data function to produce the third key. The method continues at step 968 where the processing module decrypts the re-encrypted second data partition using the third key to reproduce an encrypted second data partition. The method continues at step 970 where the processing module performs the deterministic function on the encrypted second data partition to reproduce a second key, where the deterministic function is substantially the same as a deterministic function utilized by the transforming data function to produce the second key. The method continues at step 972 where the processing module decrypts the encrypted first data partition using the second key to reproduce a first data partition. The method continues at step 974 where the processing module performs the deterministic function on the first data partition to reproduce a first key, where the deterministic function is substantially the same as a deterministic function utilized by the transforming data function to produce the first key. The method continues at step 976 where the processing module decrypts the encrypted second data partition using the first key to reproduce a second data partition.

The method continues at step 978 where the processing module de-partitions the first and second data partitions in accordance with a partitioning approach to reproduce mixed data, where the partitioning approach is substantially the same as a partitioning approach utilized by the transforming data function to reproduce the mixed data. The method continues at step 980 where the processing module extracts a data segment from the mixed data in accordance with a data injection scheme, where the data injection scheme is substantially the same as a data injection scheme utilized by the transforming data function inject generated data into the data segment to produce the mixed data. For example, the processing module discards random bytes that were injected into the data segment. Alternatively, or in addition to, the processing module validates the data segment by comparing extracted check bytes of the mixed data to expected check bytes. For example, the processing module retrieves the expected check bytes from a local memory, extracts the checks bytes in accordance with the injection scheme from the mixed data, compares the extracted check bytes to the expected check bytes, and indicates that the data segment is valid (e.g., not tampered with) when the comparison is favorable (e.g., substantially the same).

The method described above in conjunction with the processing module can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
    facilitating retrieving a set of encoded data slices from a dispersed storage network (DSN) memory;
    facilitating decoding the set of encoded data slices using a dispersed storage error encoding function to reproduce a secure package;
    de-aggregating the secure package in accordance with an aggregation scheme to reproduce an encrypted first data partition and a re-encrypted second data partition;
    performing a deterministic function on the encrypted first data partition to reproduce a third key, where the deterministic function is substantially the same as a deterministic function utilized by a transforming data function to produce the third key;
    decrypting the re-encrypted second data partition using the third key to reproduce an encrypted second data partition;
    performing the deterministic function on the encrypted second data partition to reproduce a second key, where the deterministic function is substantially the same as a deterministic function utilized by the transforming data function to produce the second key;
    decrypting the encrypted first data partition using the second key to reproduce a first data partition;
    performing the deterministic function on the first data partition to reproduce a first key, where the deterministic function is substantially the same as a deterministic function utilized by the transforming data function to produce the first key;
    decrypting the encrypted second data partition using the first key to reproduce a second data partition;
    de-partitioning the first and second data partitions in accordance with a partitioning approach to reproduce mixed data, where the partitioning approach is substantially the same as a partitioning approach utilized by the transforming data function to reproduce the mixed data; and
    extracting a data segment from the mixed data in accordance with a data injection scheme, where the data injection scheme is substantially the same as a data injection scheme utilized by the transforming data function inject generated data into the data segment to produce the mixed data.

2. The method of claim 1 further comprising validating the data segment by comparing extracted check bytes of the mixed data to expected check bytes.

3. The method of claim 2, wherein the validating includes retrieving the expected check bytes from a local memory, extracting the check bytes in accordance with the data injection scheme from the mixed data, comparing the extracted check bytes to the expected check bytes, and indicating that the data segment is valid when the comparison is favorable.

4. The method of claim 3, wherein the data segment is valid when not tampered with.

5. The method of claim 3, wherein the comparison is favorable when the extracted check bytes to the expected check bytes are substantially the same.

6. The method of claim 1, wherein the facilitating includes at least one of:
    issuing slice retrieval requests or receiving at least a decode threshold number of encoded data slices of the set of encoded data slices from the DSN memory.

7. The method of claim 1, wherein the facilitating includes decoding at least a decode threshold number of encoded data slices of the set of encoded data slices using the dispersed storage error coding function to reproduce the secure package.

8. A method for execution by one or more processing modules of one or more computing devices of a dispersed storage network (DSN), the method comprises:
    injecting generated data into a data segment to produce mixed data in accordance with a data injection scheme;
    partitioning the mixed data in accordance with a partitioning approach to produce first and second data partitions;
    performing a deterministic function on the first data partition to produce a first key;
    encrypting the second data partition using the first key to produce an encrypted second data partition;
    performing the deterministic function on the encrypted second data partition to produce a second key;
    encrypting the first data partition using the second key to produce an encrypted first data partition;
    performing the deterministic function on the encrypted first data partition to produce a third key;
    encrypting the encrypted second data partition using the third key to produce a re-encrypted second data partition;
    aggregating the encrypted first data partition and the re-encrypted second data partition in accordance with an aggregation scheme to produce a secure package;

facilitating encoding the secure package using a dispersed storage error coding function to produce a set of encoded data slices; and facilitating storing the set of encoded data slices in a dispersed storage network (DSN) memory.

9. The method of claim 8, wherein the injecting includes generating the generated data by one or more of: retrieving, generating a plurality of random bytes, or generating a plurality of check bytes.

10. The method of claim 8, wherein the partitioning is at a ratio of 50/50 or 60/40.

11. The method of claim 8, wherein the performing a deterministic function on the first data partition includes performing a hashing function on the first data partition to produce an interim result and truncating the interim result to produce the first key with a desired number of bits.

12. The method of claim 8, wherein the aggregating includes at least one of: interleaving or appending.

13. The method of claim 8, wherein the facilitating encoding encodes the secure package using the dispersed storage error coding function to produce the set of encoded data slices.

14. The method of claim 8, wherein the facilitating storing includes at least one of: sending the set of encoded data slices to an output module or outputting the set of encoded data slices to the DSN memory.

15. The method of claim 8 further comprises:
facilitating retrieving a set of encoded data slices from a dispersed storage network (DSN) memory;
facilitating decoding the set of encoded data slices using a dispersed storage error encoding function to reproduce a secure package;
de-aggregating the secure package in accordance with an aggregation scheme to reproduce an encrypted first data partition and a re-encrypted second data partition;
performing a deterministic function on the encrypted first data partition to reproduce a third key, where the deterministic function is substantially the same as a deterministic function utilized by a transforming data function to produce the third key;
decrypting the re-encrypted second data partition using the third key to reproduce an encrypted second data partition;
performing the deterministic function on the encrypted second data partition to reproduce a second key, where the deterministic function is substantially the same as a deterministic function utilized by the transforming data function to produce the second key;
decrypting the encrypted first data partition using the second key to reproduce a first data partition;
performing the deterministic function on the first data partition to reproduce a first key, where the deterministic function is substantially the same as a deterministic function utilized by the transforming data function to produce the first key;
decrypting the encrypted second data partition using the first key to reproduce a second data partition;
de-partitioning the first and second data partitions in accordance with a partitioning approach to reproduce mixed data, where the partitioning approach is substantially the same as a partitioning approach utilized by the transforming data function to reproduce the mixed data; and
extracting a data segment from the mixed data in accordance with a data injection scheme, where the data injection scheme is substantially the same as a data injection scheme utilized by the transforming data function inject generated data into the data segment to produce the mixed data.

16. A computing device of a group of computing devices of a dispersed storage network (DSN), the computing device comprises:
an interface;
a local memory; and
a processing module operably coupled to the interface and the local memory, wherein the processing module functions to:
inject generated data into a data segment to produce mixed data in accordance with a data injection scheme;
partition the mixed data in accordance with a partitioning approach to produce first and second data partitions;
perform a deterministic function on the first data partition to produce a first key;
encrypt the second data partition using the first key to produce an encrypted second data partition;
perform the deterministic function on the encrypted second data partition to produce a second key;
encrypt the first data partition using the second key to produce an encrypted first data partition;
perform the deterministic function on the encrypted first data partition to produce a third key;
encrypt the encrypted second data partition using the third key to produce a re-encrypted second data partition;
aggregate the encrypted first data partition and the re-encrypted second data partition in accordance with an aggregation scheme to produce a secure package;
facilitate encoding the secure package using a dispersed storage error coding function to produce a set of encoded data slices; and
facilitate storing the set of encoded data slices in a dispersed storage network (DSN) memory.

17. The computing device of claim 16 further comprises:
facilitating retrieving a set of encoded data slices from a dispersed storage network (DSN) memory;
facilitating decoding the set of encoded data slices using a dispersed storage error encoding function to reproduce a secure package;
de-aggregating the secure package in accordance with an aggregation scheme to reproduce an encrypted first data partition and a re-encrypted second data partition;
performing a deterministic function on the encrypted first data partition to reproduce a third key, where the deterministic function is substantially the same as a deterministic function utilized by a transforming data function to produce the third key;
decrypting the re-encrypted second data partition using the third key to reproduce an encrypted second data partition;
performing the deterministic function on the encrypted second data partition to reproduce a second key, where the deterministic function is substantially the same as a deterministic function utilized by the transforming data function to produce the second key;
decrypting the encrypted first data partition using the second key to reproduce a first data partition;
performing the deterministic function on the first data partition to reproduce a first key, where the deterministic function is substantially the same as a deterministic function utilized by the transforming data function to produce the first key;

decrypting the encrypted second data partition using the first key to reproduce a second data partition;

de-partitioning the first and second data partitions in accordance with a partitioning approach to reproduce mixed data, where the partitioning approach is substantially the same as a partitioning approach utilized by the transforming data function to reproduce the mixed data; and extracting a data segment from the mixed data in accordance with a data injection scheme, where the data injection scheme is substantially the same as a data injection scheme utilized by the transforming data function to inject generated data into the data segment to produce the mixed data.

18. The computing device of claim 16, wherein the data injection scheme includes generating the generated data by one or more of: retrieving, generating a plurality of random bytes, or generating a plurality of check bytes.

19. The computing device of claim 16, wherein the performing the deterministic function on the first data partition to reproduce a first key includes a hashing function on the first data partition to produce an interim result and truncation of the interim result to produce the first key with a desired number of bits.

20. The computing device of claim 16, wherein the aggregation scheme includes at least one of interleaving or appending.

* * * * *